United States Patent [19]

Morgan

[11] Patent Number: 5,252,808
[45] Date of Patent: Oct. 12, 1993

[54] METHOD AND APPARATUS FOR RECOVERING PETROLEUM RESIDUES FROM STORAGE SITES

[75] Inventor: Thomas A. Morgan, Pampa, Tex.

[73] Assignee: Phillips Petroleum Company, Bartlesville, Okla.

[21] Appl. No.: 796,202

[22] Filed: Nov. 22, 1991

[51] Int. Cl.⁵ .................. F27B 14/00; E01C 19/45; G01F 11/00
[52] U.S. Cl. .................. 219/421; 219/523; 392/471; 126/343.5 A; 222/405; 222/146.5
[58] Field of Search ............. 219/421, 523; 392/471, 392/301, 302, 305; 432/13, 161; 165/45; 126/271.1, 343.5 A, 343.5 R; 222/146.1, 146.2, 146.4, 146.5, 405, 464, 377

[56] References Cited

U.S. PATENT DOCUMENTS

| | | | |
|---|---|---|---|
| 1,354,757 | 10/1920 | Popcke | 392/301 |
| 1,908,932 | 5/1933 | Tiburtius | 126/343.5 A |
| 2,472,594 | 6/1949 | Kuehn et al. | 126/343.5 |
| 3,281,573 | 10/1966 | Hynes | 392/471 |
| 3,868,493 | 2/1975 | Caroleo | 219/318 |
| 4,050,740 | 9/1977 | Ellithorpe | 126/343.5 A |
| 4,117,794 | 10/1978 | Sjogren | 126/343.5 R |
| 4,230,138 | 10/1980 | Tanaka | 126/343.5 A |
| 4,534,493 | 8/1985 | Sedran | 222/146.2 |
| 4,597,609 | 7/1986 | Deszynski et al. | 299/6 |

Primary Examiner—Bruce A. Reynolds
Assistant Examiner—Michael D. Switzer
Attorney, Agent, or Firm—Ryan N. Cross

[57] ABSTRACT

A method and apparatus to melt and withdraw petroleum residue from a storage site at a convenient location while causing the residue from more distant locations to melt and flow in a stream, to the removal location. A heated wand is utilized to heat the petroleum residue. The wand has one pivotally supported end and is moved in an arc about the pivotally supported end across the storage site with removal of heated petroleum residue occurring at substantially the center of the arc.

21 Claims, 6 Drawing Sheets

METHOD AND APPARATUS FOR RECOVERING PETROLEUM RESIDUES FROM STORAGE SITES

In one aspect, this invention relates to an apparatus for recovering petroleum residues from storage sites. In another aspect, this invention relates to a method of recovering petroleum residues from storage sites.

Petroleum residues, including pitches, asphalts, tars, waxes, and paraffins, stored in large pits or vessels need to be removed from the pits or vessels in order to utilize or permanently dispose of the residues. Problems arise in removing highly viscous or solid petroleum residues because they can not be readily pumped off in a controlled manner. In addition, the removal of these residues by traditional excavation equipment may be complicated by the fluid nature of the residues or the impending need to have the solid residues melted. Thus, in order to remove these residues a method and device for melting them, heating them to a less viscous state, and subsequently dispersing them is needed.

Typically, devices, such as those disclosed in U.S. Pat. Nos. 2,472,594 and 4,534,493, for progressively melting and dispersing high viscosity material out of small containers are not suitable for the situation where the material is stored as a large body in a pit or vessel. This unsuitability results from most small container devices being dependent on the container walls and having no practical way of being scaled up to accommodate large storage sites.

A large scale device for melting and dispersing large sulfur blocks is disclosed in U.S. Pat. No. 4,597,609. In this patent, a sulfur block is melted by a heating device that is positioned on a section of the block. There is a means for withdrawing melted sulfur attached to the device. As the sulfur is melted and withdrawn, the device is progressively lowered through the block of sulfur. When the device reaches the bottom of the block, it is repositioned on a new section. This sulfur-melting method works best on solids, not semi-solids or viscous liquids. In addition, adaptation of this method for use on petroleum residue contained in very large storage sites would be unsatisfactory because it does not melt a large enough area before the device must be relocated.

It is, therefore, an object of the present invention to provide an apparatus and method to melt and disperse petroleum residue contained in a large storage site.

It is a further object of the invention to provide an apparatus and method to melt and withdraw petroleum residue at a convenient location from the surface of the petroleum residue contained in the storage site while causing the petroleum residue from more distant locations to melt and flow in a stream to the location for removal.

The above objects are realized by an apparatus which comprises a heating wand with a first end supported at a first point in close proximity to a point suitable for withdrawing heated petroleum residue, and a second end extending out from the first point and in heat transfer relation with a portion of the surface of the petroleum residue; a means for heating the wand; and a means for withdrawing the heated petroleum residue, wherein the means for withdrawing is in fluid flow communication with the withdrawing point.

According to another aspect of the invention, a method is provided which comprises extending a wand out near the surface of the petroleum residue, so that the wand is in heat transfer relation with a portion of the surface of the petroleum residue, heating the wand so that the petroleum residue in heat transfer relation with the wand is heated, keeping the first end of the wand positioned in close proximity to a withdrawing point, so that the withdrawing point is in fluid flow communication with the heated petroleum residue, and withdrawing the heated petroleum residue at the withdrawing point.

FIG. 3 is not to scale.

FIG. 5 is not to scale.

In the Figures identical reference numerals are used to denote like parts.

The suitability of the present invention for use with a substance can be readily determined by one skilled in the art, even though, the suitability is dependent on numerous conditions, such as; the ambient climate and the viscosity, adhesiveness and state (solid, liquid or gas) of the substance. Suitable substances will be those that fall into the class of petroleum residues as defined herein.

As used in the disclosure and claims, petroleum residue means a substance with a pour point such that at ambient conditions the substance will not readily flow in a controlled manner, such as through the use of a pump. Typically, for room temperature, 75° F., a petroleum residue in accordance with the above definition would have a pour point from about 40° F. to about 80° F., more appropriately between 60° F. and 80° F. The term petroleum residue includes but is not limited to the class consisting of tars, asphalts, waxes and paraffins. As used in the disclosure and claims, the term storage site includes pits, containers, and vessels that are used to store petroleum residue. Although the storage site can be almost any size, the present invention can be more advantageously employed with large storage sites, preferably ones with a surface width of greater than about 50 ft.

Figure 1:
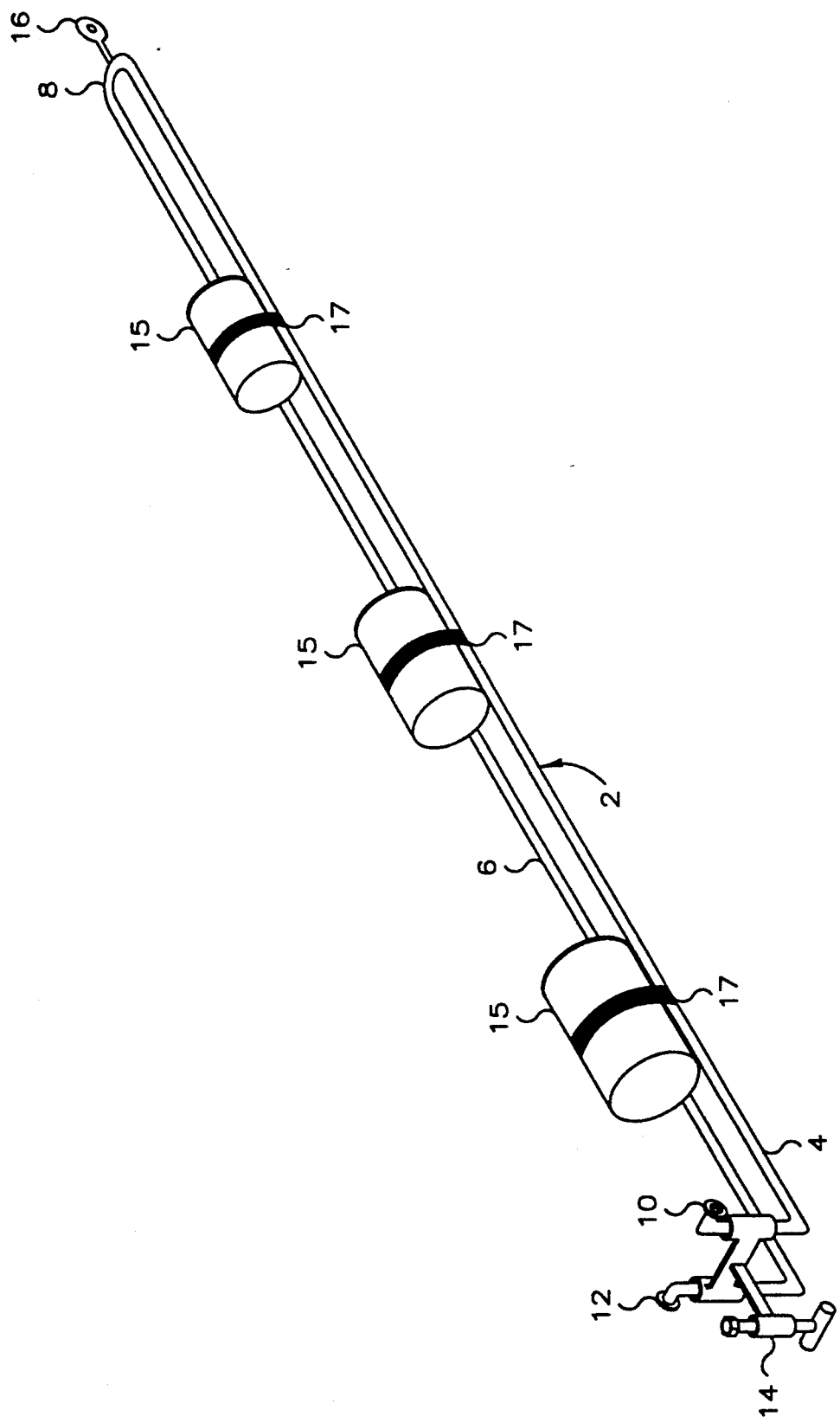
FIG. 1 is a axonometric view of one embodiment of the heating wand of the invention.

In the embodiment illustrated in FIG. 1, heating wand 2 comprises a first straight hollow tube 4 and a second straight hollow tube 6. One end of each of tubes 4 and 6 are connected by U-shaped hollow tube 8 and tubes 4 and 6 have couplings 10 and 12, respectively, on their opposing ends. Couplings 10 and 12 are for providing fluid flow communication between tubes 4 and 6 and a source of heated fluid. Coupling 14 is attached to the coupling ends of tubes 4 and 6 and typically connects heating wand 2 to a first point in close proximity to a suitable withdrawing point, see FIGS. 2 and 3. Coupling 16 is attached to U-shaped hollow tube 8 and can be used to support heating wand 2 at or near the surface and to move heating wand 2 across the storage site by a suitable means, such as crane (see FIG. 3) attached to coupling 16. Heating wand 2 is supported by supporting means in the form of a plurality of supporting devices 15. In FIG. 1 supporting devices 15 are hollow drums each attached to heating wand 2 by means of support coupling 17. Supporting devices 15 provide buoyant support of the heating wand on the surface of the petroleum residue between the couplings 14 and 16. Alternately the wand can be supported from suspension cables positioned by cranes or devices bridging the storage area.

Figure 2:
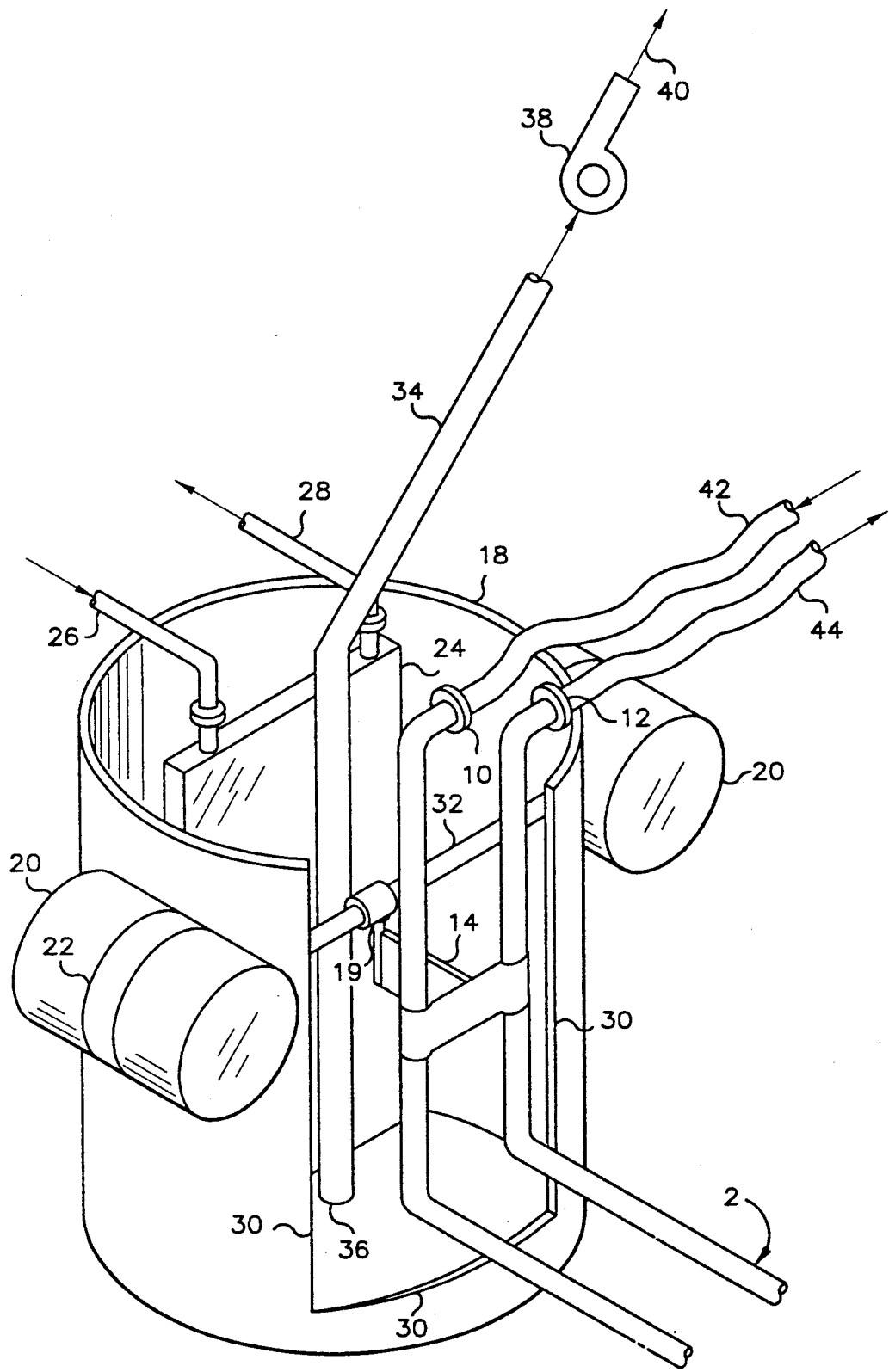
FIG. 2 is an axonometric view, with parts thereof shown schematically, of another embodiment of the invention where a sump is utilized in the collection of the petroleum residue heated by the heating wand.

In FIG. 2 heating wand 2 has been attached at first point 19 to a sump, shown as container 18. Container 18 defines a withdrawing zone where heated petroleum residue is removed from a storage site. Container 18 is partially submerged under the surface of the petroleum residue contained in the storage site and is supported by supporting devices 20. In FIG. 2, supporting devices 20 are hollow drums attached to container 18 by means of support coupling 22. Supporting devices 20 provide buoyant support of the container when it is placed in the petroleum residue. Petroleum residue in container 18 can be maintained in a heated state through a heating means, such as heating plate 24. Heating plate 24, as shown, is heated by a heat transfer fluid, such as oil or steam. Alternatively heating plate 24 can be electrically heated. Hot heat transfer fluid, if this means of heating is used, enters heating plate 24 through conduit 26 and exits through conduit 28. Container 18 has an opening defined by edges 30 which allows heated petroleum residue to flow into the removal zone. Support member 32 extends across the opening. Heating wand 2 is pivotally attached by means of coupling 14 to support member 32. Couplings 10 and 12 of heating wand 2 are attached to conduits 42 and 44 which are in fluid flow communication with a source of heated fluid. Conduit 34 extends from withdrawing point 36 contained in the withdrawing zone to pump 38 and conduit 40 extends from pump 38 to a receiver (not shown). Pump 38 is preferably located on the ground beyond the surface of the petroleum residue. The receiver can be a container suitable for storage or another device that suits the use for which the petroleum residue is to be used.

Figure 3:
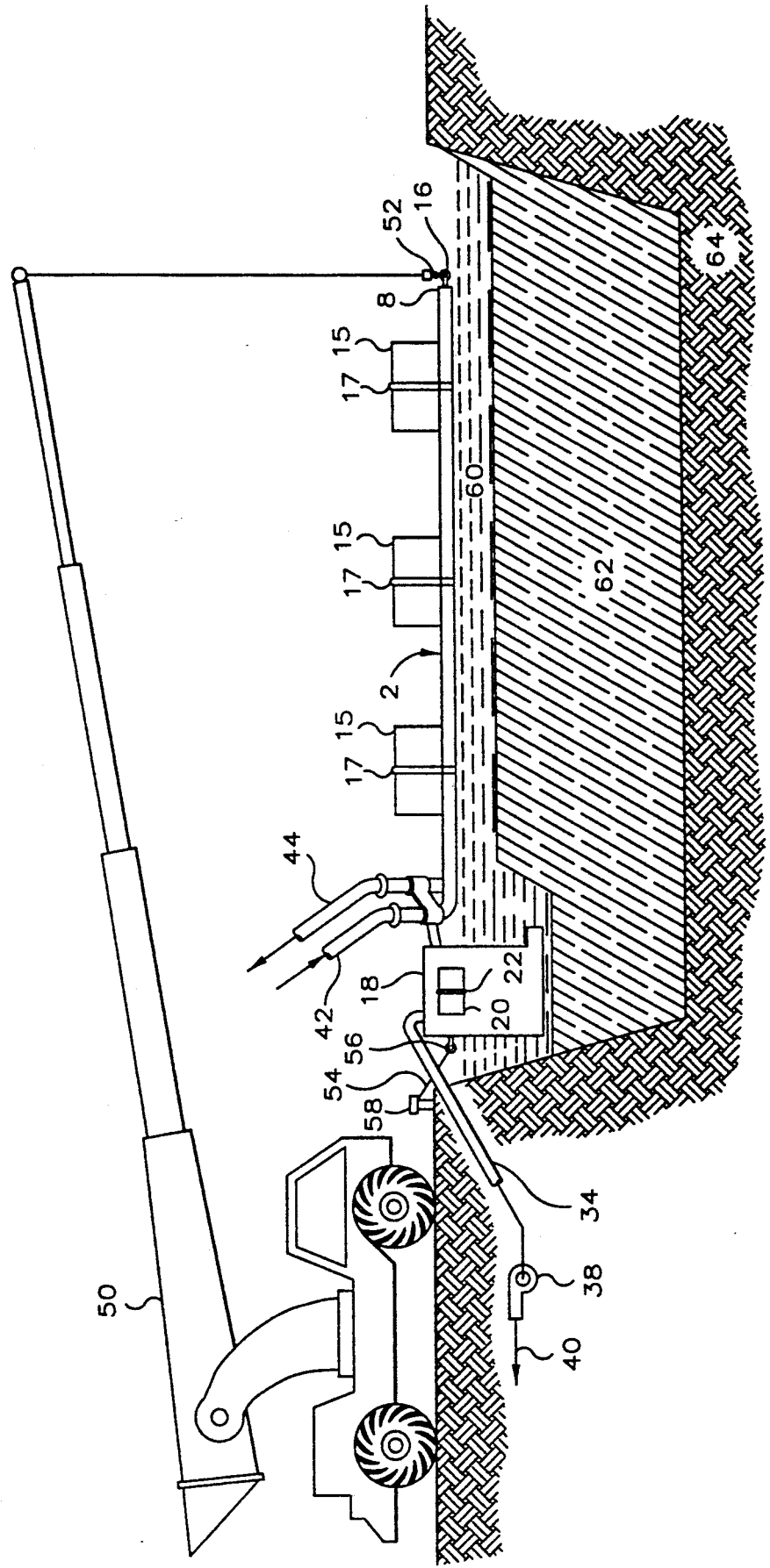
FIG. 3 is a diagrammatical representation, with parts thereof shown schematically, of the embodiment of FIG. 2, wherein the heating wand and sump are shown in relation to a storage site.

In FIG. 3, the apparatus of FIGS. 1 and 2 is shown in relation to a storage site. Parts of the apparatus of FIGS. 1 and 2 have not been shown in FIG. 3 for clarity. Heating wand 2 is shown supported at or near the surface of the petroleum residue in the storage site by floatation devices 15 attached to heating wand 2 by attachment coupling 17. Hook 52 of crane 50 is used to move and position wand 2. Hook 52 is attached to heating wand 2 by coupling 16. The other end of wand 2 is supported by container 18 which is supported near the surface by supporting device 20. Alternate wand support devices could include support cables or bridges, or booms to suspend the wand at the surface. Additionally, container 18 is kept stationary by cable 54 which is attached to container 18, at one end by coupling 56 and is attached to stake 58 at the other end. Stake 58 is inserted firmly in the ground to curtail movement of container 18. Alternatively, other methods of keeping container 18 stationary and buoyant can be used, such as providing a submerged platform for container 18 to rest upon or digging away part of the storage site shore and resting container 18 on the ground next to the petroleum residue and at least partially below the petroleum residue surface level.

Heated liquid petroleum residue 60 is shown partially surrounding heating wand 2 and container 18. Below heated petroleum residue 60 is unheated petroleum residue 62. The storage site is shown as being formed by ground 64, but can be formed by any appropriate material, such as concrete or metal. FIG. 3 represents heated liquid petroleum residue 60 and unheated petroleum residue 62 differently to represent that heated liquid petroleum 60 has a different viscosity and/or phase than that of unheated petroleum residue 62. While FIG. 3 depicts the transition between the two viscosity and/or phases as abrupt, it should be understood that normally the transition would be gradual.

In the operation of the embodiment of FIGS. 1–3, wand 2 is attached to first point 19 in close proximity to withdrawing point 36 by coupling 14, typically the first point will be close enough to the withdrawing point to allow the withdrawing point to be in fluid flow relation with the petroleum residue heated by wand 2. Wand 2 extends out from first point 19 and is in heat transfer relation with the surface of the petroleum residue. Preferably, heating wand 2 is on or adjacent to the surface of the petroleum residue. Heating wand 2 is heated so that it in turn heats the adjacent petroleum residue to form heated liquid petroleum residue 60, which more readily flows than does the unheated petroleum residue. In FIGS. 1–3 heating wand 2 is heated by circulation of a heat transfer fluid. The fluid can be any suitable heat transfer fluid such as oil or steam. Furthermore, other methods of heating can be used including electrical heating means, preferably in the form of one or more resistance heating elements. The heat transfer fluid is heated by a heater (not shown) in fluid flow communication with a pump (not shown). The pump is in fluid flow communication with conduit 42. The pump circulates the hot heat transfer fluid through conduit 42 and into wand 2. The heat transfer fluid circulates through wand 2 and then back to the heater through conduit 44. Thus, the hot transfer fluid is circulated through first straight hollow tube 4, U-shaped hollow tube 8, and second straight hollow tube 6 of heating wand 2, which are in fluid flow communication with each other and conduits 42 and 44.

In container 18, shown in more detail in FIG. 2, petroleum residue heated by heating plate 24 is withdrawn through conduit 34, located at withdrawing point 36, by pump 38. Pump 38 then transfers petroleum residue via conduit 40 to receiver (not shown). As heated petroleum residue is removed from container 18, the level of the surface of the heated petroleum residue within container 18 is lowered to below that of the heated petroleum residue outside of container 18. Gravity causes heated petroleum residue outside container 18 to flow into container 18 through the opening defined by edges 30. Thus, as heated petroleum residue is drawn from container 18, the heated petroleum residue heated by wand 2 tends to flow toward and into container 18 and can be removed at the withdrawing point. As the petroleum residue is heated and withdrawn, heating wand 2 can be moved across the surface of the petroleum residue in an arc, with the end of wand 2 that is attached to first point 19 at the center of the arc; thus, preferably, first point 19 is held fixed relative to the storage site.

Heating wand 2 may be flexible or rigid. Preferably, heating wand 2 is a rigid hollow tube pivotally mounted at a fixed first point and extending out from the fixed first point and looping back to the fixed first point. FIG. 3 shows heating wand 2 being moved by crane 50 located on the shore of the storage site near container 18. It should be understood that crane 50 can be located at any convenient location on the shore around the storage site.

Figure 4:
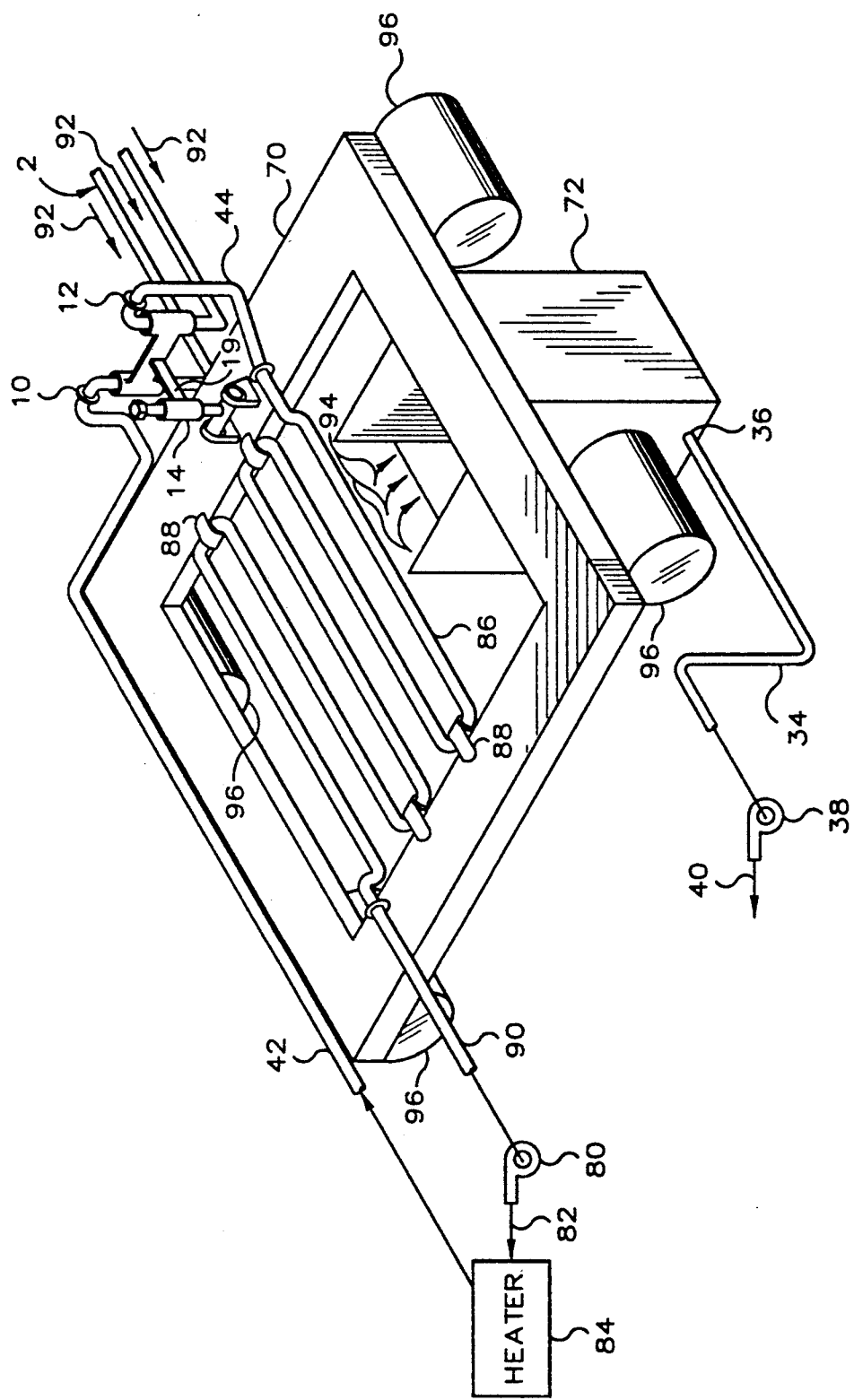
FIG. 4 is an axonometric view, with parts thereof shown schematically, of an embodiment of the invention where a barge is utilized in the collection of the petroleum residue heated by the heating wand.

Referring now to the embodiment illustrated in FIG. 4 heating wand 2 is attached to heated barge 70. Heating wand 2 is pivotally attached to heated barge 70 at first point 19 by coupling 14. Heated barge 70 is located on the surface of the petroleum residue at a suitable withdrawing point 36. Heated barge 70 supports a sump, shown as container 72. Container 72 defines a withdrawing zone where heated petroleum residue is removed from the storage site. Pump 38 is in fluid flow communication with sump 72 and removes the heated petroleum residue from sump 72 via conduit 34 which is attached to sump 72 at withdrawing point 36. The heated residue is then transferred via conduit 40 to a receiver (not shown). Pump 38 can be mounted alternatively on barge 70 or on the ground beyond the surface of the petroleum residue.

As in FIG. 1 heating wand 2 consists of a hollow tube which is heated by a heat transfer fluid. The heat transfer fluid is pumped by pump 80 to heater 84 via conduit 82. Heater 84 is in fluid flow communication with heating wand 2 by conduit 42. The fluid is circulated to heating wand 2 via conduit 42, which is attached to wand 2 at coupling 10. The fluid is circulated through heating wand 2, and then through serpentine coiled tube 86. Tube 86 is in fluid flow communication with wand 2 by conduit 44, which is attached at one end to coupling 12 and at the other to tube 86. Serpentine coiled tube 86 is attached to barge 70 by couplings 88 at various places. Although the serpentine coiled tube in FIG. 4 is shown connected to the same heating and circulating system as wand 2, it can have a separate heating and circulating system.

From serpentine coil tube 86, the fluid flows to conduit 90 which is in fluid flow communication with serpentine coil tube 86 and pump 80.

Figure 5:
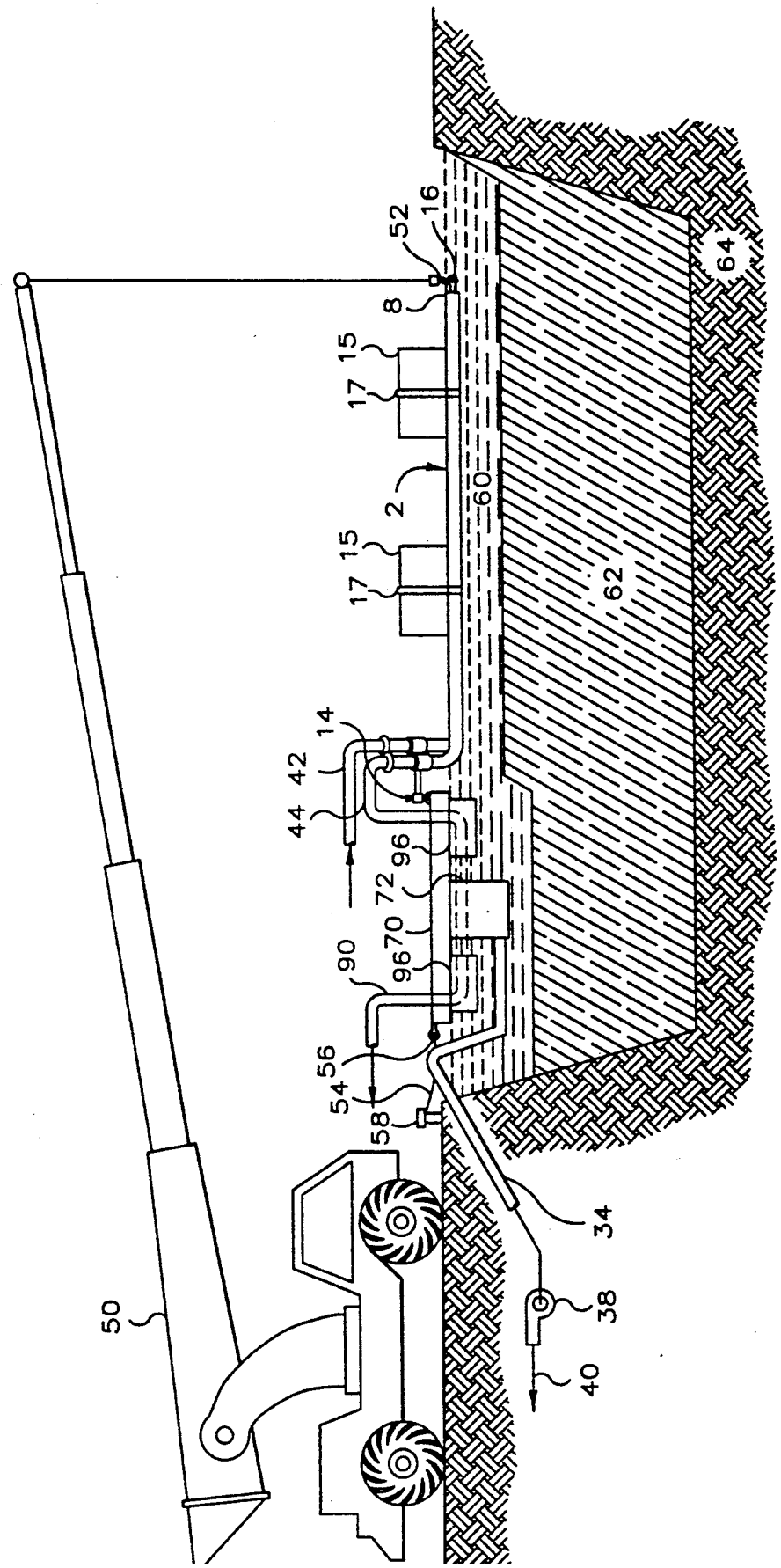
FIG. 5 is a diagrammatical representation, with parts thereof shown schematically, of the embodiment of FIG. 4, wherein the heating wand and barge are shown in relation to a storage site.

FIG. 5 illustrates the embodiment of FIG. 4 in relation to the storage site. Parts of the apparatus of FIG. 4 have not been shown in FIG. 5 for clarity. In FIG. 5, heating wand 2 is supported at or near the surface of the petroleum residue in the storage site. Heating wand 2 is supported by support devices 15 attached to wand 2 with couplings 17. Support devices 15 provide buoyant support for the heating wand on the surface of the petroleum residue. Hook 52 is attached to heating wand 2 by coupling 16 to move and position wand 2. Crane 50 is used to move heating wand 2 across the storage site. At the other end, heating wand 2 is supported by heated barge 70. Heated barge 70 is in turn supported by support devices 96, which provide buoyant support for the heated barge on the surface of the petroleum residue. Heating wand 2 is attached to heated barge 70 by means of pivotal coupling 14. Additionally, heated barge 70 can be kept stationary by cable 54 which is attached to heated barge 70 at one end by coupling 56 and is attached to stake 58 at the other end. Stake 58 is inserted firmly in the ground to curtail movement of the barge.

As in FIG. 3, heated liquid petroleum residue 60 and unheated petroleum residue 62 are shown to represent the difference in viscosity and/or phase that occurs from petroleum residue being in heat transfer relation with hot heating wand 2. Again, the transition is depicted as abrupt but is normally gradual.

In operation, the embodiment of FIGS. 4 and 5 is similar to that of FIGS. 1-3. Petroleum residue is heated by heated barge 70 and heating wand 2. Heated petroleum residue is removed at the drawing point 36 through conduit 34 by pump 38. As heated petroleum residue is removed from sump 72, containing withdrawing point 36, gravity causes petroleum residue heated by the barge near the sump to flow into sump 72, as shown by arrows 94 in FIG. 4. As the heated petroleum residue near the sump flows into sump 72, gravity causes heated petroleum residue, heated by the wand, to flow toward the barge. Heated petroleum residue is shown flowing parallel with heated wand 2 in FIG. 4 by arrows 92. Thus, petroleum residue from distant points can be removed from one stationary removal point, such as withdrawing point 36.

As petroleum residue is removed, crane 50 can be used to move the heating wand in an arc across the surface of the petroleum residue in the storage site, with pivotal coupling 14 serving as the center of the arc. Crane 50 can be located at any convenient spot along the storage site shore.

Figure 6:
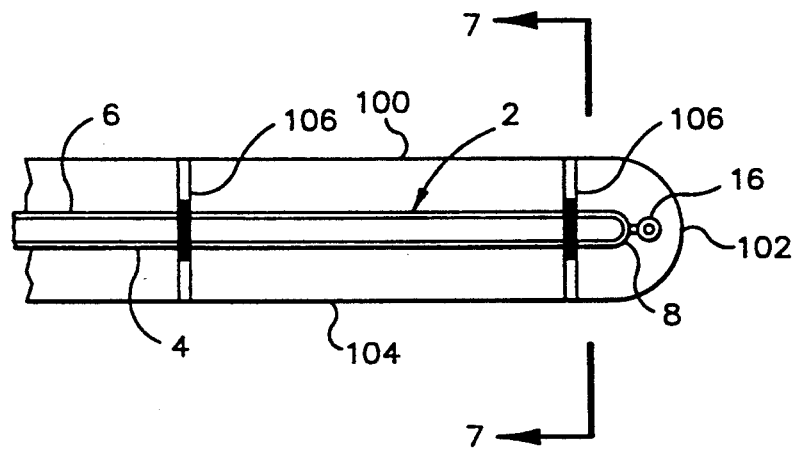
FIG. 6 is a partial top plan view of a portion of an embodiment of the invention illustrating restraining sides attached to a heating wand.

In the embodiment illustrated in FIG. 6, restraining sides 100, 102 and 104 have been attached to heated wand 2. The sides are attached by couplings 106. The restraining sides 100 and 104 can extend along substantially the full length of heating wand 2, although the present invention contemplates the employment of restraining sides of less than the full length of wand 2. The restraining sides 100, 102 and 104 restrain the heated liquid petroleum residue so that at least a portion of heated liquid petroleum residue flows substantially parallel to the wand in the channel formed by the restraining sides, thus preventing the petroleum residue from flowing perpendicular or askew to the wand and into unrecoverable low spots nearby. This embodiment is intended to be an option designed to make the system more efficient when the surface of the storage empoundment is not level or flat. It is intended to contain the melted residue within its boundaries so that flow would not be lost to area that may be locally lower than the intended path of application.

Figure 7:
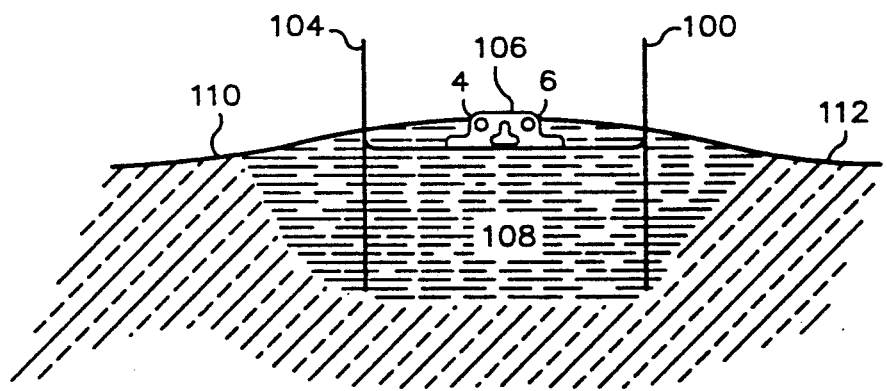
FIG. 7 is a cross section view taken along line 7—7 of FIG. 6 more clearly illustrating the relationship among the heating wand, the restraining sides and the heated petroleum residue.

FIG. 7 illustrates the embodiment illustrated in FIG. 6 from a cross-sectional view along line 7—7. Restraining sides 100 and 104 are shown preventing the heated liquid petroleum residue in channel 108 from flowing into nearby low spots 110 and 112.

Restraining sides 100 and 104 are placed around heating wand 2 so as to prevent heated liquid petroleum residue in channel 108 from flowing askew to wand 2. Preferably restraining side 102 is positioned to also prevent heated liquid petroleum residue in channel 108 from flowing parallel with wand 2 but away from the withdrawing point. The restraining sides are placed a suitable distance from the wand to maximize recovery of heated residue but close enough so that they rest within the petroleum residue heated by the wand.

Changes may be made in the construction, combination and arrangement of parts or elements as heretofore set forth in the specification and shown in the drawings without departing from the spirit and scope of the invention, as defined in the following claims.

That which is claimed is:

1. An apparatus for removing petroleum residue from a storage site at a withdrawing point which comprises:

a heating wand having a first end and a second end, said first end of said heating wand supported at a first point in close proximity to said withdrawing point and said second end of said heating wand extending out from said first point and in heat transfer relation with a portion of the surface of said petroleum residue;

means for heating said heating wand, so that said portion of the surface of said petroleum residue that is in heat transfer relation with said heating wand, is heated to form a liquid heated petroleum residue;

means for withdrawing said heated liquid petroleum residue from said storage site, said means for withdrawing being in fluid flow communication with said withdrawing point; and means operatively related to said heating wand for moving said second end of said heating wand so that said heating wand travels across said storage site in an arc, said first end of said heating wand being at substantially the center of said arc.

2. An apparatus as recited in claim 1, further comprising means for supporting said heating wand so that said heating wand stays in heat transfer relation with said portion of the surface of said petroleum residue;

3. An apparatus as recited in claim 1, wherein said first end of said heating wand is pivotally secured at first point.

4. An apparatus as recited in claim 1, wherein at least two restraining sides are attached to said heating wand so that a channel is formed by said restraining sides with said heating wand in said channel and so that at least a portion of said heated liquid petroleum residue flows substantially parallel to the wand.

5. An apparatus as recited in claim 1 wherein said heating wand comprises:

a first straight hollow tube having a first end and a second end;

a U-shaped hollow tube having a first end and a second end, said first end of said U-shaped hollow tube connected in fluid flow communication with said second end of said first straight hollow tube;

a second straight hollow tube having a first end and a second end, said first end of said second straight hollow tube connected in fluid flow communication with said second end of said U-shaped hollow tube; and said first end of said first straight hollow tube and said second end of said second straight hollow tube being fixedly secured together at said first end of said heating wand, and said first end of said heating wand being pivotally supported at said first point.

6. An apparatus as recited in claim 5, wherein said means for heating said heating wand comprises:

circulating means in fluid flow communication with said heating wand, for circulating heat transfer fluid through said heating wand; and fluid heating means operationally related to said circulating means for heating said heat transfer fluid.

7. An apparatus as recited in claim 1, further comprising:

a barge having means for buoyantly supporting said barge on said petroleum residue in said storage site and having a sump depending therefrom, said sump containing said withdrawing point, and said first end of said heating wand being supported on said heated barge; and means carried by said barge for heating at least a portion of said petroleum residue adjacent to said barge.

8. An apparatus as recited in claim 1, further comprising:

a container containing said withdrawing point and extending at least partially below the surface of said petroleum residue wherein said first end of said heating wand is supported adjacent said container.

9. An apparatus as recited in claim 8, wherein said container has an opening extending from the surface of said petroleum residue to below said surface of said petroleum residue and said container further comprises means for supporting said first end of said heating wand adjacent said opening.

10. An apparatus as recited in claim 8, further comprising means operatively related to said container for heating said container.

11. An apparatus as recited in claim 1, wherein;

said heating wand comprises a first straight hollow tube having a first end and a second end, a U-shaped hollow tube having a first end and a second end, said first end of said U-shaped hollow tube connected in fluid flow communication with said second end of said first straight hollow tube, and a second straight hollow tube having a first end and a second end, said first end of said second straight hollow tube connected in fluid flow communication with said second end of said U-shaped hollow tube;

said first end of said first straight hollow tube and said second end of said second straight hollow tube being fixedly secured together at said first end of said heating wand, and said first end of said heating wand being pivotally supported at said first point; and said means for heating said heating wand comprises circulating means in fluid flow communication with said heating wand for circulating a heat transfer fluid through said heating wand, and fluid heating means operatingly related to said circulating means for heating said heat transfer fluid;

and said apparatus further comprises:

means for supporting said heating wand so that said heating wand stays in heat transfer relation with a portion of the surface of said petroleum residue; and at least two restraining sides attached to said heating wand so that a channel is formed by said restraining sides with said heating wand in said channel and so that at least a portion of said heated petroleum residue flows substantially parallel to said wand.

12. An apparatus as recited in claim 11, further comprising:

a barge having means for buoyantly supporting said barge on said petroleum residue in said storage site and having a sump depending therefrom, said sump containing said withdrawing point, and said first end of said heating wand is pivotally supported on said heated barge; and a means carried by said barge for heating at least a portion of said petroleum residue adjacent to said barge.

13. An apparatus as recited in claim 11 further comprising:

a container containing said withdrawing point and extending at least partially below the surface of said petroleum residue, said container having an opening extending from the surface of said petroleum residue to below the surface of said petroleum residue;

means for pivotally supporting said first end of said heating wand adjacent to said opening; and means operatively related to said container for heating said container.

14. A method of removing petroleum residue from a storage site at a withdrawing point which comprises:
   (a) extending a wand with a first end and a second end out near the surface of said petroleum residue, so that the wand is in heat transfer relation with a portion of the surface of said petroleum residue;
   (b) heating said wand so that said petroleum residue in heat transfer relation with said wand is heated to form heated liquid petroleum residue;
   (c) keeping said first end of said wand positioned in close proximity to said withdrawing point, so that said withdrawing point is in fluid flow communication with said heated liquid petroleum residue; and
   (d) withdrawing said heated liquid petroleum residue from said storage site at said withdrawing point.

15. A method as recited in claim 14 further comprising moving said second end of said wand such that said wand travels across said storage tank in an arc with said first end of said wand at substantially the center of said arc.

16. A method as recited in claim 14 further comprising supporting said wand so that said wand stays in heat transfer relation with the surface of said petroleum residue.

17. A method as recited in claim 14, which further comprises positioning a pair of restraining sides around said wand so that said heated liquid petroleum residue will flow substantially parallel to said wand.

18. A method as recited in claim 14, further comprising heating said wand in step (b) by circulating a hot heat transfer fluid through said wand.

19. A method as recited in claim 14, further comprising allowing at least a portion of said heated liquid petroleum residue to flow to a withdrawing zone before said step (d), said withdrawing zone containing said withdrawing point and extending at least partially below the surface of said petroleum residue.

20. A method as recited in claim 19, further comprising heating said withdrawing zone.

21. A method as recited in claim 14 further comprising:
   moving said second end of said wand such that said wand travels across said storage tank in arc, said first end of said wand being at substantially the center of said arc;
   supporting said wand, so that said wand stays in heat transfer relation with a portion of the surface of said petroleum residue;
   heating said wand in step (b) by circulating a hot heat transfer fluid through said wand;
   positioning a pair of restraining sides around said wand, so that at least a portion of said heated liquid petroleum residue will flow substantially parallel with said wand; and
   allowing at least a portion of said heated liquid petroleum residue to flow to a heated withdrawing zone before said step (d), said heated withdrawing zone containing said withdrawing point and extending at least partially below the surface of said petroleum residue.

* * * * *